(12) United States Patent
Okazaki et al.

(10) Patent No.: US 9,619,097 B2
(45) Date of Patent: Apr. 11, 2017

(54) TOUCH PANEL AND DISPLAY DEVICE WITH TOUCH PANEL

(71) Applicant: Japan Display Inc., Tokyo (JP)

(72) Inventors: Kengo Okazaki, Mobara (JP); Tsutomu Sato, Mobara (JP); Yasuaki Kondo, Mobara (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 14/730,924

(22) Filed: Jun. 4, 2015

(65) Prior Publication Data

US 2015/0277637 A1  Oct. 1, 2015

Related U.S. Application Data

(63) Continuation of application No. 13/430,740, filed on Mar. 27, 2012, now Pat. No. 9,092,099.

(30) Foreign Application Priority Data

Mar. 31, 2011   (JP) .................................. 2011-077945

(51) Int. Cl.
G06F 3/047 (2006.01)
G06F 3/044 (2006.01)
G09G 5/00 (2006.01)

(52) U.S. Cl.
CPC .............. *G06F 3/047* (2013.01); *G06F 3/044* (2013.01); *G09G 5/003* (2013.01); *G06F 2203/04107* (2013.01); *G09G 2300/0426* (2013.01)

(58) Field of Classification Search
None
See application file for complete search history.

(56) References Cited

U.S. PATENT DOCUMENTS 8,217,916 B2 * 7/2012 Anno ...................... G06F 3/044
                                                                  345/173
2007/0295967 A1   12/2007 Harada et al.
(Continued)

FOREIGN PATENT DOCUMENTS

JP       2008-010440 A      1/2008
JP       2008-015403 A      1/2008
(Continued)

OTHER PUBLICATIONS

Office Action dated May 22, 2015 for a counterpart Japanese patent application No. 2014-024986.
(Continued)

*Primary Examiner* — Kenneth B Lee, Jr.
(74) *Attorney, Agent, or Firm* — Typha IP LLC

(57) ABSTRACT

The touch panel is provided with: a touch panel substrate; and a flexible printed circuit board, wherein the touch panel substrate has an electrode for detection and a rear surface electrode, the flexible printed circuit board has a terminal portion, the terminals in the terminal portion are electrically and mechanically connected to connection terminals formed along a side of the touch panel substrate, the terminal portion has a first terminal portion and a second terminal portion, a terminal in the second terminal portion is shorter than a terminal in the first terminal portion, the flexible printed circuit board has a rear surface electrode connection portion and has a terminal for shielding, and the rear surface electrode connection portion is folded on a rear surface side of the touch panel substrate so that the terminal for shielding is mechanically and electrically connected to the rear surface electrode.

14 Claims, 8 Drawing Sheets

(56) References Cited

U.S. PATENT DOCUMENTS

2008/0005897 A1 1/2008 Nakanishi
2008/0117124 A1* 5/2008 Hong ...................... H01J 11/10
                   345/60

FOREIGN PATENT DOCUMENTS

JP   2010-113498 A  5/2010
JP   2010-205220 A  9/2010
KR 10-2011-0027472 A  3/2011

OTHER PUBLICATIONS

Office Action dated Jun. 25, 2014 for a counterpart Korean patent application No. 10-2013-68007.

* cited by examiner

TOUCH PANEL AND DISPLAY DEVICE WITH TOUCH PANEL

CROSS-REFERENCE TO RELATED APPLICATION

This application is a continuation of U.S. application Ser. No. 13/430,740, filed on Mar. 27, 2012, which claims priority over Japanese application JP 2011-077945 filed on Mar. 31, 2011, the entire contents of which are hereby incorporated into this application by reference.

BACKGROUND OF THE INVENTION (1) Field of the Invention

The present invention relates to a touch panel and a display device with a touch panel, and in particular, to a technology that is effective when applied to a capacitive-coupling type touch panel.

(2) Description of the Related Art

In recent years, the touch panel technology for supporting a graphical user interface that is "friendly to humans" has become important as mobile devices spread. Capacitive-coupling type touch panels are known in this touch panel technology.

In general, touch panels are provided on a display panel, and a fluctuation in the signal voltage generated for display is radiated as noise from such display panels.

Therefore, capacitive-coupling type touch panels have been know, where a transparent conductive film (rear surface electrode for shielding) is provided on the rear surface of the touch panel substrate in order to suppress the effects of the noise generated from the display panel (see JP 2010-113498A).

SUMMARY OF THE INVENTION

In JP 2010-113498A, a rear surface connection pad is formed on the front surface of the touch panel substrate in order to supply a predetermined voltage (for example, ground voltage) to the rear surface electrode for shielding provided on the rear surface of the touch panel substrate so that the rear surface connection pad and the rear surface electrode for shielding are connected through a conductive member (for example, conductive tape). Here, in JP 2010-113498A, the rear surface connection pad is connected to the connection terminal for the rear surface through a wire, and the connection terminal for the rear surface is connected to the flexible printed circuit board.

In accordance with the above-described method, according to which the rear surface connection pad and the rear surface electrode for shielding are connected through a conductive member, however, it is assumed that the conductive member may peel over time and reliability will be lost.

Therefore, the rear surface electrode connection portion is provided on the flexible printed circuit board so that the terminal for shielding formed in the rear surface electrode connection portion is connected to the rear surface electrode for shielding, and thus, a predetermined voltage is supplied to the rear surface electrode for shielding.

In accordance with the conventional method, according to which the rear surface electrode connection portion is folded on the rear surface of the touch panel substrate so that the terminal for shielding in the rear surface electrode connection portion is connected to the rear surface electrode so as to provide a predetermined voltage to the rear surface electrode, however, the rear surface electrode connection portion greatly sticks out from the touch panel substrate, which causes such a problem that production is difficult.

The present invention is provided in order to solve the above-described problem with the prior art, and an object of the present invention is to provide a technology which makes it possible to increase production for a capacitive-coupling type touch panel where a rear surface electrode connection portion is used to supply a predetermined voltage to the rear surface electrode provided on the rear surface of the touch panel substrate.

Another object of the present invention is to provide a display device with a capacitive-coupling type touch panel as described above.

The above-described and other objects, as well as novel features of the present invention, will be clarified by the description of the present specification and the accompanying drawings.

Typical inventions from among those disclosed in the present specification can be simply summarized as follows.

(1) A touch panel is provided with: a touch panel substrate; and a flexible printed circuit board, wherein the above-described touch panel substrate has an electrode for detection formed on a front surface and a rear surface electrode formed on a rear surface, the above-described flexible printed circuit board has a terminal portion where a number of terminals are formed, the terminals in the above-described terminal portion are electrically and mechanically connected to connection terminals formed along a side of the above-described touch panel substrate, the above-described terminal portion has a first terminal portion and a second terminal portion, a terminal in the above-described second terminal portion is shorter than a terminal in the above-described first terminal portion, the above-described flexible printed circuit board has a rear surface electrode connection portion that continues to the above-described second terminal portion and has a terminal for shielding at one end on the side opposite to the above-described second terminal portion, and the above-described rear surface electrode connection portion is folded on a rear surface side of the above-described touch panel substrate so that the above-described terminal for shielding is mechanically and electrically connected to the above-described rear surface electrode on the above-described touch panel substrate.

(2) The touch panel according to (1), wherein the terminal in the above-described second terminal portion has a length that is half or less of that of the terminal in the above-described first terminal portion.

(3) The touch panel according to (1), wherein the terminal in the above-described second terminal portion is a dummy terminal that does not contribute to operation of the above-described touch panel.

(4) The touch panel according to (1), wherein the above-described rear surface electrode connection portion is folded on the rear surface side of the above-described touch panel substrate along the above-described side of the above-described touch panel substrate, and the above-described terminal for shielding is mechanically and electrically connected to the above-described rear surface electrode on the above-described touch panel substrate.

(5) The touch panel according to (1), wherein the above-described flexible printed circuit board has a wire for shielding that supplies a predetermined voltage to the above-described rear surface electrode, part of the above-described wire for shielding is formed along the above-described side of the above-described touch panel substrate in the vicinity of the terminal of the above-described second terminal portion.

(6) The touch panel according to (1), wherein a semiconductor chip for driving the above-described electrode for detection is mounted on the above-described flexible printed circuit board.

(7) The touch panel according to (1), wherein the above-described electrode for detection is formed of a number of X electrodes and a number of Y electrodes that cross the above-described number of X electrodes.

(8) A display device with a touch panel is provided with: a display panel; and a touch panel provided on the above-described display panel, wherein the above-described touch panel is the touch panel according to any of (1) to (7).

The effects gained by the typical inventions from among those disclosed in the present specification are briefly described as follows.

According to the present invention, it is possible to increase production for a capacitive-coupling type touch panel where a predetermined voltage is supplied to the rear surface electrode provided on the rear surface of the touch panel substrate using a rear surface electrode connection portion.

DESCRIPTION OF THE EMBODIMENTS

In the following, an embodiment of the present invention is described in detail in reference to the drawings.

Here, the same symbols are attached to components having the same functions throughout all the drawings for illustrating the embodiment, and the same descriptions are not repeated. In addition, the following embodiment does not limit the interpretation of the scope of claims of the present invention.

Embodiment

The present embodiment is described using a liquid crystal display panel, which is an example of a display panel, but any display panel can be used as long as it can use a touch panel, and thus, it is possible to use an organic light emitting diode element or a surface-conductive type electron-releasing element without being limited to a liquid crystal display panel.

Figure 1:
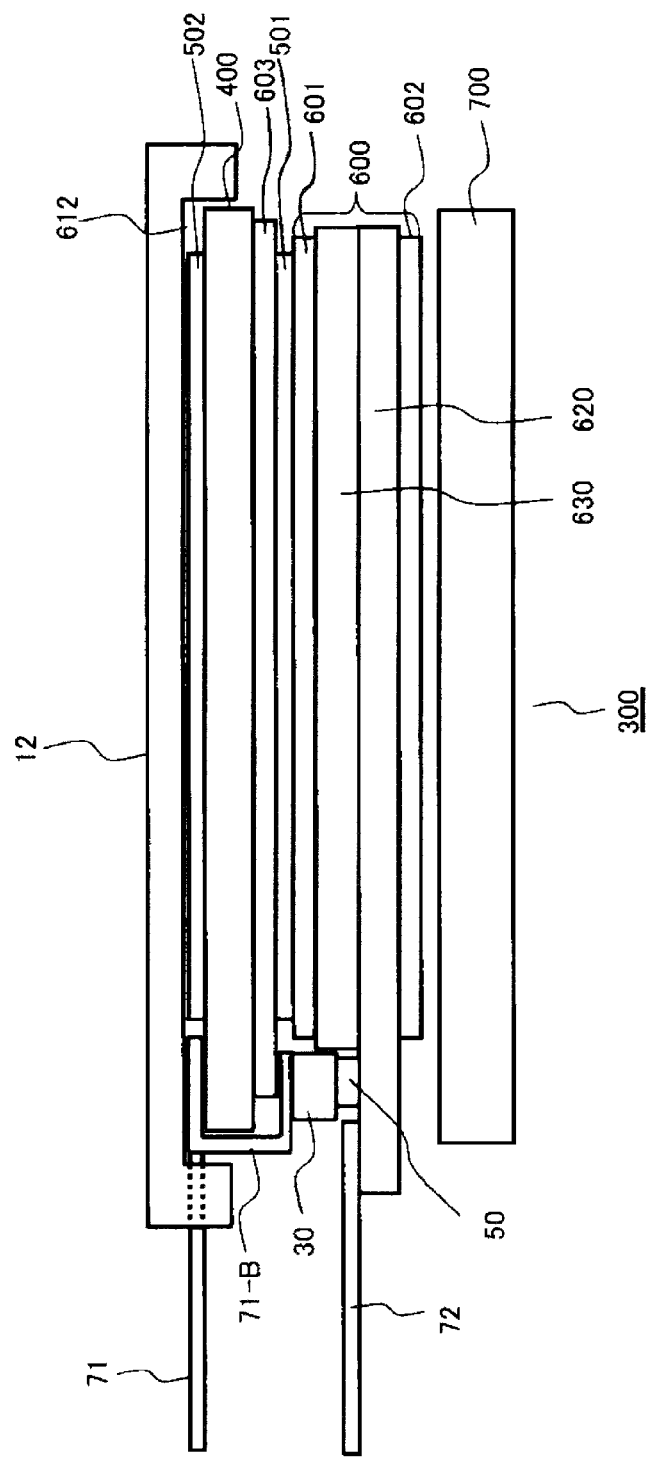
FIG. 1 is a cross-sectional diagram showing the structure of the display device with a touch panel according to an embodiment of the present invention.

FIG. 1 is a cross-sectional diagram showing the structure of the display device with a touch panel according to the embodiment of the present invention.

As shown in FIG. 1, the display device 300 in the present embodiment is provided with a liquid crystal display panel 600, a capacitive-coupling type touch panel 400 provided on the surface of the liquid crystal display panel 600 on the observer's side, and a backlight 700 provided on the surface of the liquid crystal display panel 600 on the side opposite to the observer's side. Examples of the liquid crystal display panel 600 include IPS type, TN type and VA type liquid crystal display panels.

The liquid crystal display panel 600 is formed of two substrates, 620 and 630, which are pasted together so as to face each other, and polarizing plates 601 and 602 are provided on the outside of the two substrates. In addition, the liquid crystal display 600 and the touch panel 400 are joined together using a first adhesive 501 made of a resin adhesive film or the like.

Furthermore, a front protective plate 12 (also referred to as front window or front panel) made of an acryl resin or glass is pasted to the outside of the touch panel 400 using a second adhesive 502 made of a resin adhesive film or the like.

A recess 612 is provided in the front protective plate 12, which is thin in a region that overlaps the touch panel 400 and thick in the peripheral portion. As a result, the detection sensitivity is high, and at the same time, the strength of the front protective plate 12 is secured in the present embodiment.

A transparent conductive layer (rear surface electrode according to the present invention) 603 made of ITO is provided on the liquid crystal display panel side of the touch panel 400. This transparent conductive layer 603 is formed in order to shield signals generated from the liquid crystal display panel 600.

A great number of electrodes are provided on the liquid crystal display panel 600 so that a voltage is applied as a signal to the electrodes in accordance with different set timing. These changes in the voltage in the liquid crystal display panel 600 cause noise to the electrode provided on the capacitive-coupling type touch panel 400.

Therefore, it is necessary for the touch panel 400 to be electrically shielded from the liquid crystal display panel 600, and the transparent conductive layer 603 is provided as a shielding electrode. The transparent conductive layer 603 is supplied with a predetermined voltage from the flexible printed circuit board 71 or the like so as to function as a shielding electrode, and the voltage is, for example, the grounding voltage.

The flexible printed circuit board 71 is connected to the connection terminal (not shown) formed on the surface on which electrodes for the touch panel 400 are formed (hereinafter referred to as front surface), and the flexible printed circuit board 71 has a rear surface electrode connection portion (71-B) for supplying a voltage, for example, the grounding voltage, to the surface on which the transparent conductive layer 603 is provided (hereinafter referred to as rear surface).

Here, it is desirable for the transparent conductive layer 603 to have a sheet resistance value of 150 to 200Ω/□, which is approximately the same as that of the electrodes provided on the touch panel 400, in order to suppress the noise. In the case where the transparent conductive layer 603 for shielding has approximately the same or lower resistance in comparison with the electrodes provided on the touch panel 400, the effects of suppressing noise increase.

An arbitrary voltage, such as the grounding voltage, is supplied to the transparent conductive layer 603 provided on the rear surface of the touch panel 400 through the flexible printed circuit board 71.

In addition, as shown in FIG. 1, a spacer 30 is inserted between the substrate 620 and the touch panel 400 in the present embodiment. In the structure where the liquid crystal display panel 600 is combined with the touch panel 400 and the front window 12 (hereinafter referred to as hybrid structure), such a problem arises that the strength of the glass of the substrate 620 in the liquid crystal display panel 600 is weak.

The substrate 620 extends more than the other substrate 630 by a portion of the plate on which a driving circuit 50 is mounted. In some cases, such a problem arises that the substrate 620 is damaged in the region where this driving circuit 50 is mounted. Therefore, the spacer 30 is inserted between the substrate 620 and the touch panel 400 in order to increase the strength.

Figure 2:
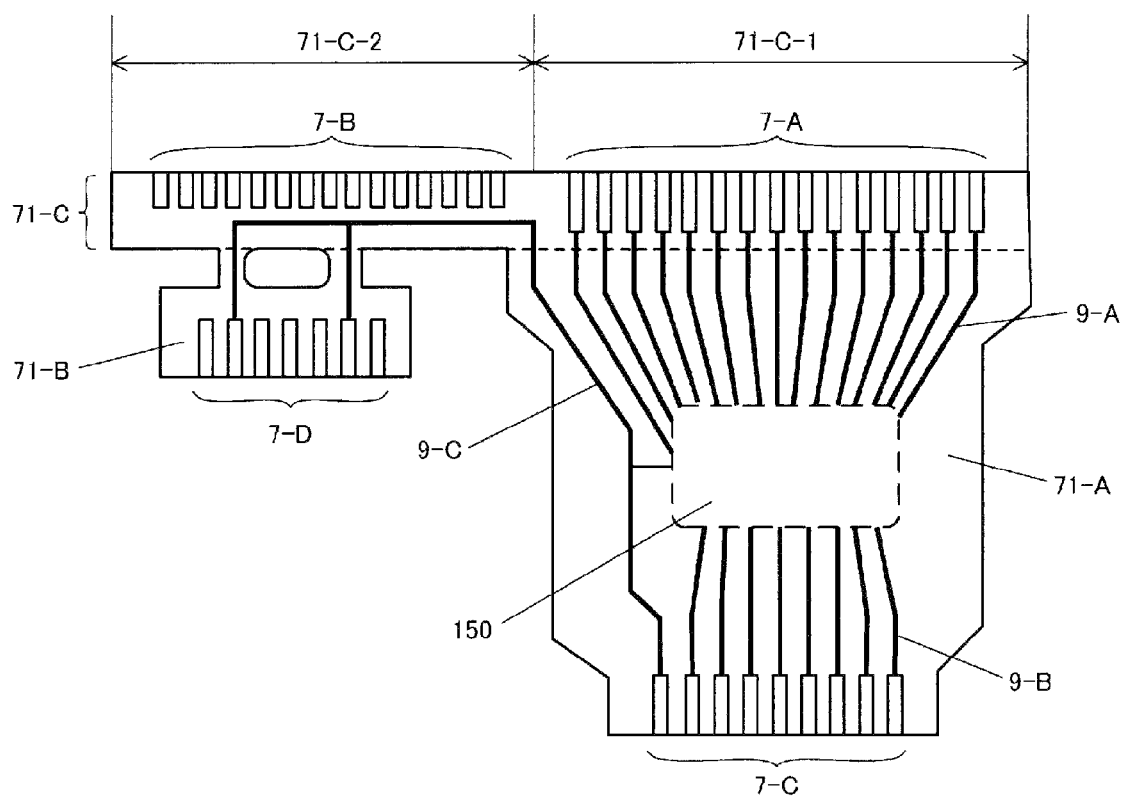
FIG. 2 is a schematic diagram for illustrating the flexible printed circuit board in the touch panel according to the embodiment of the present invention.

FIG. 2 is a schematic diagram for illustrating the flexible printed circuit board 71 in the touch panel according to the embodiment of the present invention. Here, FIG. 2 is merely a schematic diagram which does not necessarily show the actual flexible printed circuit board 71.

As shown in FIG. 2, the flexible printed circuit board 71 has a terminal portion (71-C), the main body portion (71-A) and a rear surface electrode connection portion (71-B). The terminal portion (71-C) is formed of a first terminal portion (71-C-1) having a first terminal group (7-A) and a second terminal portion (71-C-2) having a second terminal group (7-B).

The terminals in the first terminal group (7-A) are electrically and mechanically connected to the connection terminals formed on the front surface of the glass substrate 5 that forms the touch panel substrate using an ACF (anisotropic conductive film). The second terminal group (7-B) consists of terminals for securing the flexible printed circuit board to the glass substrate. By providing the second terminal group (7-B), the first terminal portion (71-C-1) and the second terminal portion (71-C-2) have approximately the same height so that the entire area of the terminal portion (71-C) can be secured to the glass substrate using the ACF. In this case, the second terminal group (7-B) is not connected to wires. In addition, wires may be connected to the terminals in the second terminal group (7-B) so that the connection terminals formed on the front surface of the glass substrate 5 that forms the touch panel substrate and the second terminal group (7-B) can be electrically and mechanically connected using the ACF.

In addition, a driving circuit (semiconductor chip) 150 for driving the detection electrodes formed on the front surface of the glass substrate 5 that forms the touch panel substrate is mounted on the main body portion (71-A) in the flexible printed circuit board 71. This driving circuit 150 controls the system so that the input locations are detected, for example.

Here, FIG. 2 is a diagram showing the flexible printed circuit board 71 as viewed from the surface on which the terminals in the first terminal group (7-A) and the second terminal group (7-B) are formed (hereinafter referred to as rear surface of the flexible printed circuit board 71), and the driving circuit 150 is formed on the front side of the flexible printed circuit board 71.

The terminals in the first terminal group (7-A) are respectively connected to the input/output terminals of the driving circuit 150 through wires (9-A), whereas the terminals in the second terminal group (7-B) and the connection terminals electrically and mechanically connected to the terminals in the second terminal group (7-B)(connection terminals formed on the front surface of the glass substrate 5) are not connected to the input/output terminals of the driving circuit 150, and thus, the terminals in the second terminal group (7-B) are provided as dummy terminals or dummy connection terminals which do not relate (or contribute) to the operation of the touch panel 400. In reality, the terminals in the first terminal group (7-A) include dummy terminals, which are not shown in FIG. 2.

A third terminal group (7-C) that consists of a number of terminals for inputting or outputting external signals is provided at one end on the side opposite to the first terminal portion (71-C-1) in the main body portion (71-A) on the flexible printed circuit board 71. The terminals in the third terminal group (7-C) are respectively connected to the input/output terminals of the driving circuit 150 through wires (9-B).

In addition, a fourth terminal group (7-D) is provided at the end of the rear surface electrode connection portion (71-B) on the flexible printed circuit board 71 on the side opposite to the second terminal portion (71-C-2). This fourth terminal group (7-D) includes a terminal for shielding in order to supply a predetermined voltage (here, the grounding voltage of GND) to the transparent conductive layer 603 for shielding. A predetermined voltage (here, the grounding voltage of GND) is supplied from the outside to the terminal for shielding through the GND wire (9-C).

The terminals in the fourth terminal group (7-D) are electrically and mechanically connected to the transparent conductive layer 603 for shielding formed on the rear surface of the glass substrate 5 that forms a touch panel substrate through ACF.

Though in FIG. 2 a case where there are two terminals for shielding is assumed, all of the terminals in the fourth terminal group (7-D) may be electrically and mechanically connected to the transparent conductive layer 603 for shielding formed on the rear surface of the glass substrate 5 that forms the touch panel substrate through ACF.

As described above, the driving circuit 150 is formed on the front side of the flexible printed circuit board 71, and the terminals and wires of the flexible printed circuit board 71 are formed on the rear side of the flexible printed circuit board 71. Accordingly, some of the wires (9-A, 9-B, 9-C) are connected wires formed on the front side of the flexible printed circuit board 71 through contact holes, though not shown.

Figure 3A:
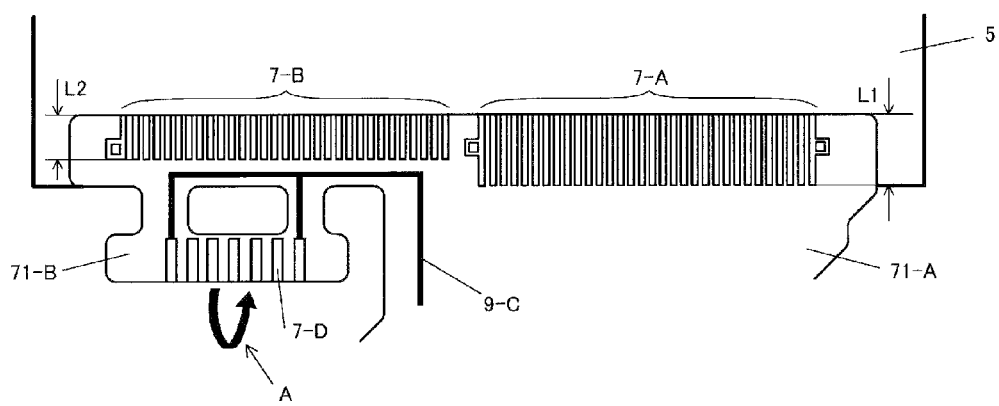
FIGS. 3A and 3B are diagrams for illustrating a method for fixing the touch panel substrate to the flexible printed circuit board in the touch panel according to the embodiment of the present invention.
Figure 3B:
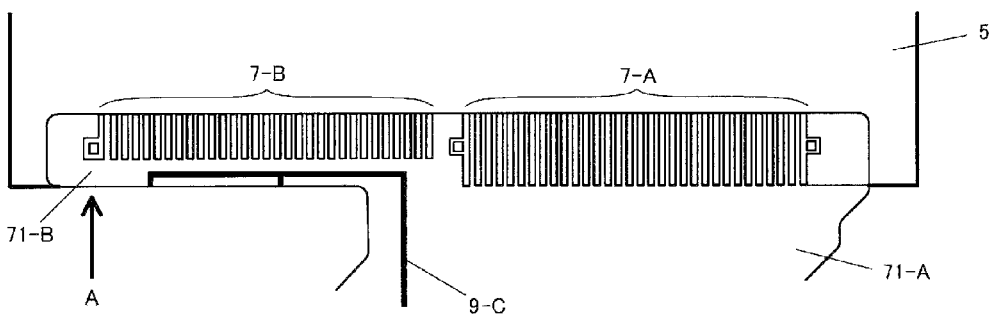

FIGS. 3A and 3B are diagrams for illustrating a method for securing the touch panel substrate to the flexible printed circuit board 71 in the touch panel according to the embodiment of the present invention. In addition, FIGS. 4A and 4B are diagrams for illustrating a method for securing the touch panel substrate to the flexible printed circuit board 71 in a conventional touch panel.

Figure 4A:
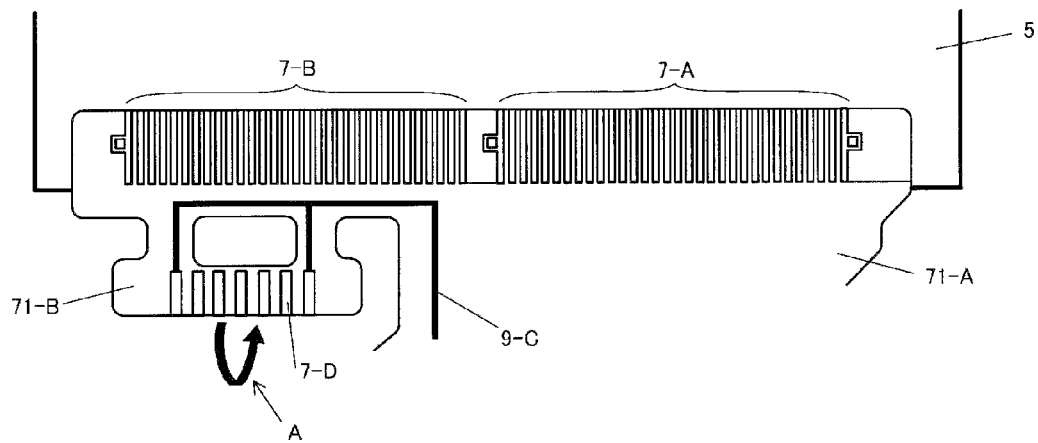
FIGS. 4A and 4B are diagrams for illustrating a method for fixing the touch panel substrate to the flexible printed circuit board in a conventional touch panel.
Figure 4B:
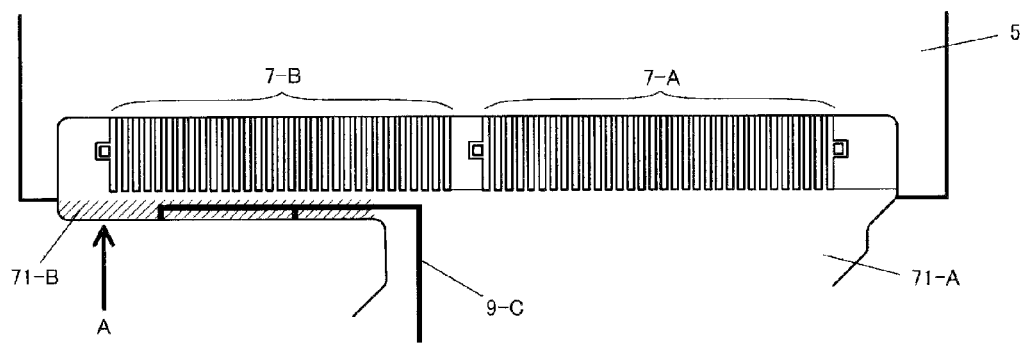

Here, FIGS. 3A and 4A are diagrams showing the state where the flexible printed circuit board 71 is electrically and mechanically connected to the front along one side of the glass substrate 5 that forms the touch panel substrate through ACF, and FIGS. 3B and 4B are diagrams showing the state where the rear surface electrode connection portion (71-B) of the flexible printed circuit board 71 is electrically and mechanically connected to the rear surface of the glass substrate 5 that forms the touch panel substrate through ACF.

In the conventional flexible printed circuit board 71 shown in FIGS. 4A and 4B, the length of the first terminal group (7-A) is the same as the length of the second terminal group (7-B), whereas in the flexible printed circuit board 71 according to the present embodiment shown in FIG. 3, the length of the second terminal group (7-B) is shorter than the length of the first terminal group (7-A). The terminals on the flexible printed circuit board have a width in the direction in which the terminals are aligned and have a length (L1, L2) in the direction perpendicular to the direction in which the terminals are aligned.

Therefore, as shown by A in FIG. 4A, the rear surface electrode connection portion (71-B) is folded on the rear side of the glass substrate 5 that forms the touch panel substrate so that the fourth terminal group (7-D) of the rear surface electrode connection portion (71-B) is electrically and mechanically connected to the transparent conductive layer 603 for shielding formed on the rear surface of the glass substrate 5 through ACF, and in this case, it is necessary for the rear surface electrode connection portion (71-B) to be folded in a region other than the region where the GND wire (9-C) of the rear surface electrode connection portion (71-B) is formed so that the GND wire (9-C) is not twisted and cut.

Accordingly, as shown by A in FIG. 4B, the rear surface electrode connection portion (71-B) in the folded state may stick out from the side of the glass substrate 5 (the side where the first terminal group (7-A) and the second terminal group (7-B) are connected to each other) in the conventional touch panel.

Thus, there is a problem such that it takes time to position the fourth terminal group (7-D) of the rear surface electrode connection portion (71-B) to a predetermined location in this state.

In contrast to this, as shown in FIG. 3A, in the flexible printed circuit board 71 according to the present embodiment, the length (L2) of the second terminal group (7-B) is shorter than the length (L1) of the first terminal group (7-A). Here, in the present embodiment, it is desirable for the length (L2) of the second terminal group (7-B) to be half or less of the length (L1) of the first terminal group (7-A) (L2≤L1/2).

Accordingly, as shown by A in FIG. 3A, in the present embodiment, the rear surface electrode connection portion (71-B) of the flexible printed circuit board 71 is folded on the rear side of the glass substrate 5 that forms the touch panel substrate so that the fourth terminal group (7-B) of the rear surface electrode connection portion (71-B) is electrically and mechanically connected to the transparent conductive layer 603 for shielding formed on the rear surface of the glass substrate 5 through ACF, and in this case, the GND wire (9-C) can be formed along one side of the glass substrate 5 in the vicinity of the second terminal group (7-B), that is to say, it is possible for the GND wire (9-C) to be located in the front of the glass substrate 5, and therefore, as shown in FIG. 3B, it is possible to fold the rear surface electrode connection portion (71-B) along the side of the glass substrate 5 (side where the first terminal group (7-A) and the second terminal group (7-B) are connected to each other).

Accordingly, in the touch panel according to the present embodiment, the rear surface electrode connection portion (71-B) is pressed against one side of the glass substrate 5 (side where the first terminal group (7-A) and the second terminal group (7-B) are connected to each other) so as to be folded so that the fourth terminal group (7-D) of the rear surface electrode connection portion (71-B) can be electrically and mechanically connected to the transparent conductive layer 603 for shielding formed on the rear surface of the glass substrate 5 that forms the touch panel substrate through ACF, and therefore, it is possible to increase production in comparison with the conventional touch panel.

Figure 5:
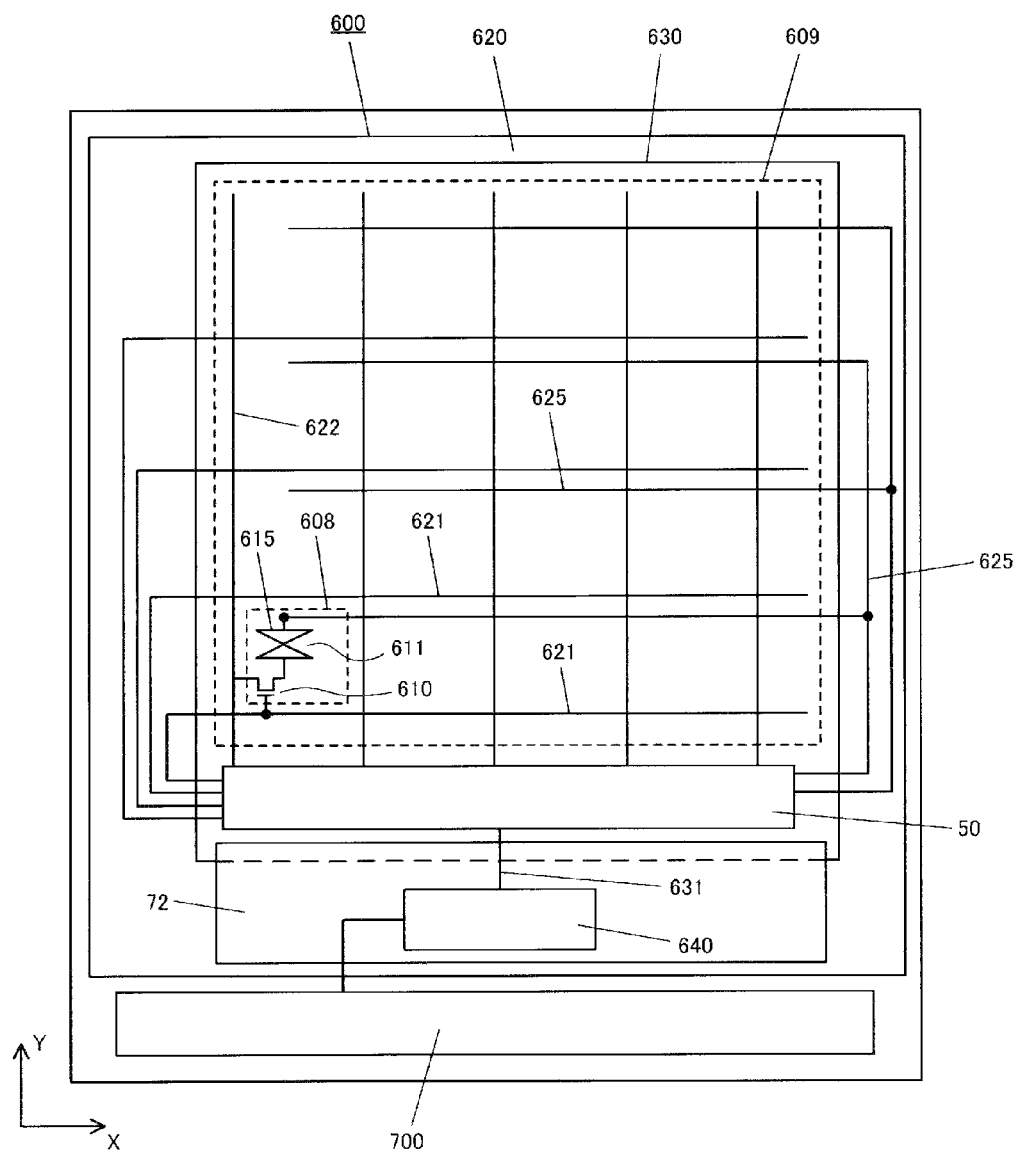
FIG. 5 is a block diagram showing the basic structure of the liquid crystal display panel according to the embodiment of the present invention.

Next, the liquid crystal display panel 600 is described in reference to FIG. 5. Here, FIG. 5 is a block diagram showing the basic structure of the liquid crystal display panel 600. In FIG. 5, the touch panel 400 has been omitted in order to clearly illustrate the liquid crystal display panel 600.

As described above, the liquid crystal display device is formed of a liquid crystal display panel 600, a driving circuit 50, a flexible printed circuit board 72 and a backlight 700. The driving circuit 50 is provided along one side of the liquid crystal display panel 600, and this driving circuit 50 supplies various types of signals to the liquid crystal display panel 600. The flexible printed circuit board 72 is electrically connected to the liquid crystal display panel 600 in order to supply an external signal to the driving circuit 50.

The liquid crystal display panel 600 is formed of a substrate 620 (hereinafter also referred to as TFT substrate), where thin film transistors 610, pixel electrodes 611, counter electrodes (common electrodes) 615 and the like are formed, and a substrate 630 (hereinafter also referred to as filter substrate), where color filter and the like are formed in such a manner that the two substrates are pasted together with a predetermined space in between using a sealing material (not shown) provided in frame form in the vicinity of the periphery between the two substrates, and at the same time, a liquid crystal composite is sealed inside the sealing material, and furthermore, polarizing plates 601, 602 (see FIG. 2) are pasted to the outside of the two substrates and the flexible printed circuit board 72 is connected to the TFT substrate 620.

Here, the present embodiment can be applied to a so-called lateral electric field type liquid crystal display panel where the counter electrodes 615 are provided on the TFT substrate 620 and to a so-called longitudinal electric field type liquid crystal display panel where the counter electrodes 615 are provided on the filter substrate 630 in the same way.

In FIG. 5, scanning lines (also referred to as gate lines), which run in the direction x in the figure and are aligned in the direction y, and video lines (also referred to as drain lines), which run in the direction y and are aligned in the direction x, are provided, and pixel portions 608 are formed in regions between a pair of scanning lines 621 and a pair of video lines 622.

Thus, the liquid crystal display panel 600 is provided with a great number of pixel portions 608 in a matrix, but FIG. 5 shows only one pixel portion 608 in order to simplify the figure. The pixel portions 608 arranged in a matrix form a display region 609 where each pixel portion 608 works as a pixel of the displayed image when an image is displayed in the display region 609.

The source of the thin film transistor 610 in each pixel portion 608 is connected to the pixel electrode 611, the drain is connected to the video line 622, and the gate is connected to the scanning line 621. This thin film transistor 610 functions as a switch for supplying a display voltage (gradient voltage) to the pixel electrode 611.

Here, the source and the drain may be vice versa depending on their relationship with the bias. Here, the one connected to the video signal line 622 is referred to as the drain.

In addition, a liquid crystal capacitance is formed between the pixel electrode 611 and the counter electrode 615.

In addition, the counter electrode 615 of each pixel portion 608 is connected to the counter electrode signal line 625.

The driving circuit 50 is provided on a transparent insulating substrate (glass substrate, resin substrate or the like) that forms the TFT substrate 620. The driving circuit 50 is connected to the scanning lines 621, the video signal lines 622 and the counter electrode signal lines 625.

The flexible printed circuit board 72 is connected to the TFT substrate 620. In addition, a connector 640 is provided on the flexible printed circuit board 72. The connector 640 is connected to an external signal line so that a signal is inputted from the outside through the connector 640. A wire 631 is provided between the connector 640 and the driving circuit 50 so that a signal from the outside is inputted into the driving circuit 50.

In addition, the flexible printed circuit board 72 supplies a constant voltage to the backlight 700. The backlight 700 is used as the light source for the liquid crystal display panel 600. Here, the backlight 700 is provided on the rear or the front of the liquid crystal display panel 600, but in FIG. 5, the backlight 700 is shown side-by-side with the liquid crystal display panel 600 in order to simplify the figure.

A control signal that has been fed from the control unit (not shown) provided outside the liquid crystal display panel 600 and the power supply voltage that has been supplied from the external power supplying circuit (not shown) are inputted into the driving circuit 50 through the connection 640 and the wire 631.

The signals inputted into the driving circuit 50 from the outside include control signals, such as a clock signal, a display timing signal and a horizontal sync-signal, data for display (R•G•B) and a display mode control command, and the driving circuit 50 drives the liquid crystal display panel 600 on the basis of the inputted signals.

The driving circuit 50 is formed of a semiconductor integrated circuit (LSI) in one chip and has a circuit for outputting scanning signals to the scanning lines 621, a circuit for outputting video signals to the video lines 622, and a circuit for outputting a counter electrode voltage (common voltage) to the counter electrode signal lines 625.

The driving circuit 50 supplies a "High" level selection voltage (selection scanning signal) to each scanning line 621 in the liquid crystal display panel 600 one after another for each horizontal scanning time on the basis of the reference clock generated inside. As a result, a number of thin film transistors 610 connected to each scanning line 621 in the liquid crystal display panel 600 make electrical connections between the video lines 622 and the pixel electrodes 611 during one horizontal scanning period.

In addition, the driving circuit 50 outputs a gradient voltage that corresponds to the gradient to be displayed by pixels to the video lines 622. When a thin film transistor 610 is in an on state (conducting), the gradient voltage (video signal) is supplied to the pixel electrode 611 from the video line 622. After that, the gradient voltage on the basis of the image to be displayed by the pixel is held by the pixel electrode 611 when the thin film transistor 610 is changed to the off state.

A constant counter electrode voltage is applied to the counter electrodes 615, and the difference in the potential between a pixel electrode 611 and a counter electrode 615 changes the direction in which the liquid crystal molecules sandwiched in-between are aligned in the liquid crystal display panel 600 so that the transmittance and the reflectance of light are changed, and thus, an image is displayed.

In addition, the driving circuit 50 performs a common inversion driving for outputting a counter electrode voltage that inverts the polarity for a constant period of time to a counter electrode signal line 625 in order to perform alternating current driving.

As described above, the changes in these signals for driving the liquid crystal display panel 600 are detected as noise in the touch panel 400. Thus, measures against it have become necessary. In particular, the touch panel 400 naturally encourages user input on the basis of the image displayed on the liquid crystal display panel 600 and needs to be provided so as to overlap the display device, such as the liquid crystal display panel 600, and therefore is strongly affected by the noise generated by the display device that overlaps the touch panel in proximity.

Figure 6:
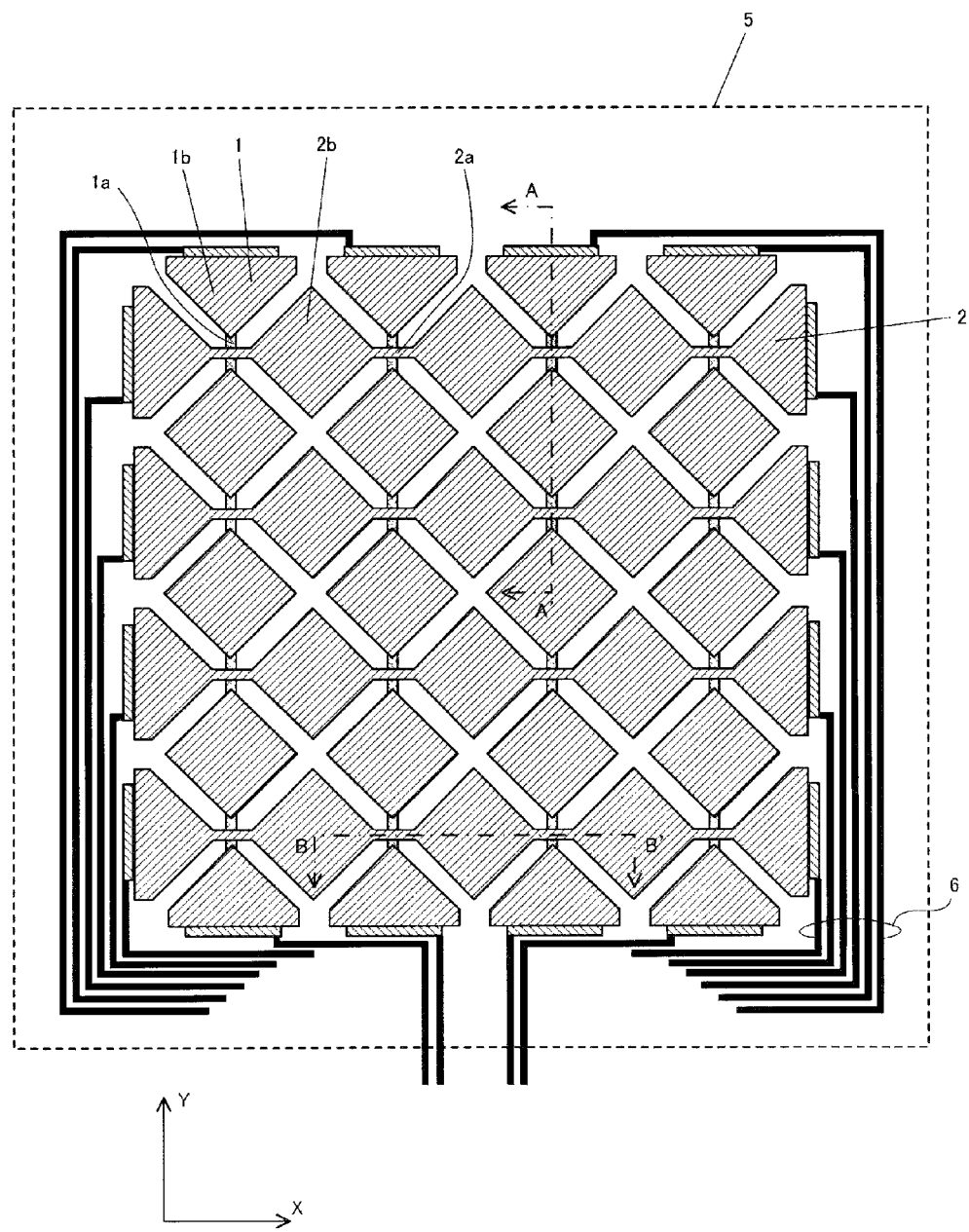
FIG. 6 is a plan diagram schematically showing the structure of the touch panel according to the embodiment of the present invention.
Figure 7:
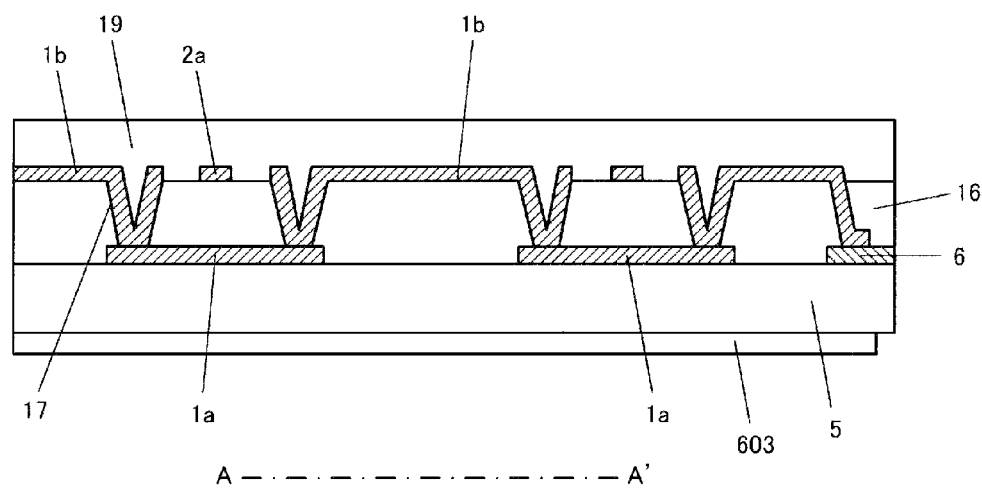
FIG. 7 is a cross-sectional diagram showing the structure along line A-A' in FIG. 6.
Figure 8:
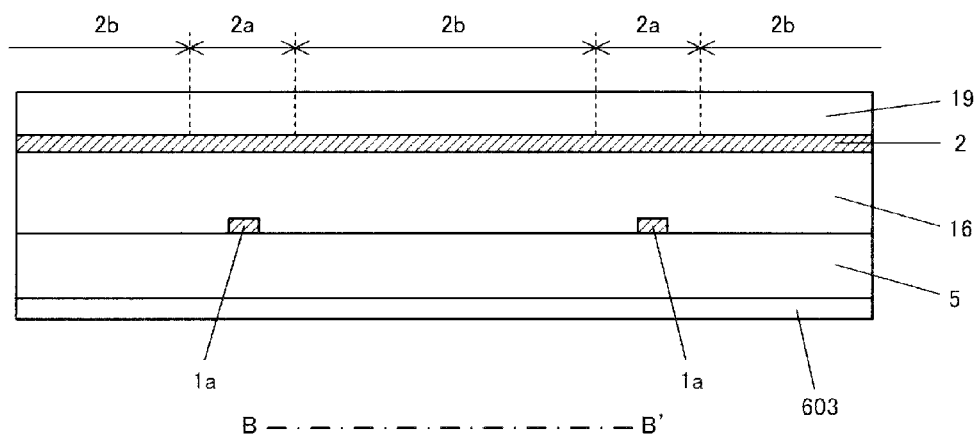
FIG. 8 is a cross-sectional diagram showing the structure along line B-B' in FIG. 6.

Next, the touch panel according to the embodiment of the present invention is described in reference to FIGS. 6 to 8. FIG. 6 is a plan diagram schematically showing the structure of the touch panel according to the embodiment of the present invention, FIG. 7 is a cross-sectional diagram showing the structure along line A-A' in FIG. 6, and FIG. 8 is a cross-sectional diagram showing the structure along line B-B' in FIG. 6.

The touch panel 600 shown in FIG. 6 has a number of X electrodes 2, which run in the first direction (for example, direction X) and are aligned in the second direction (for example, direction Y) that crosses the above-described first direction with a predetermined pitch for alignment, and a number of Y electrodes 1, which run in the above-described second direction so as to cross these X electrodes 2 and are aligned in the above-described first direction with a predetermined pitch for alignment.

Each of the number of X electrodes 2 is formed of an intersection portion 2a and an electrode portion 2b of which the width is greater than that of this intersection portion 2a. Each of the number of X electrodes 2 is provided on the surface of the glass substrate 5 on the observer's side with an interlayer insulating film 16 in-between and is covered with the top layer protective film 19 formed in the layer above the X electrode 2. Here, a transparent insulating substrate may be used instead of the glass substrate 5.

Each of the number of Y electrodes 1 is formed of an intersection portion 1a and an electrode portion 1b of which the width is greater than that of this intersection portion 1a. The electrode portion 1b of each of the number of Y electrodes 1 is formed in the same layer as the X electrodes 2 as being separated from the X electrodes 2. That is to say, the electrode portion 1b of each of the number of Y electrodes 1 is provided on the surface of the glass substrate 5 on the observer's side with the interlayer insulating film 16 in-between in the same manner as the X electrodes 2 and is covered with the top layer protective film 19 that is formed in the layer above the Y electrode 1.

The intersection portion 1a of each of the number of Y electrodes 1 is provided on the surface of the glass substrate 5 on the observer's side and is covered with the interlayer insulating film 16 formed in the layer above the intersection portion 1a. The intersection portion 1a of a Y electrode 1 crosses the intersection portion 2a of an X electrode 2 in a plane and is electrically and mechanically connected to the two electrode portions 1b that are adjacent to each other with this intersection portion 2a in between through a contact hole 17 created in the interlayer insulating film 16.

The touch panel 400 has a center region where the number of electrodes 1Y and 1X are provided and a peripheral region that is provided around this center region. The peripheral region of the touch panel 400 is provided with a number of peripheral wires 6, which are electrically connected to the number of electrodes 1Y and the number of X electrodes 2, respectively, as shown in FIG. 6. Here, the Y electrodes 1 and the X electrodes 2 are formed of ITO (indium tin oxide), for example.

Though FIGS. 6 to 8 show an example where the intersection portions 1a of the Y electrodes 1 and the peripheral wires 6 are formed in the same layer on the glass substrate 5, the electrode portions 1b of the Y electrodes 1 and the intersection portions 2a and the electrode portions 2b of the X electrodes 2 may be formed in the same layer on the glass substrate 5, while the intersection portions 1a of the Y electrodes 1 may be formed on the interlayer insulating film 16.

Furthermore, the Y electrodes 1 and the X electrodes 2 may be formed in different layers.

Figure 9:
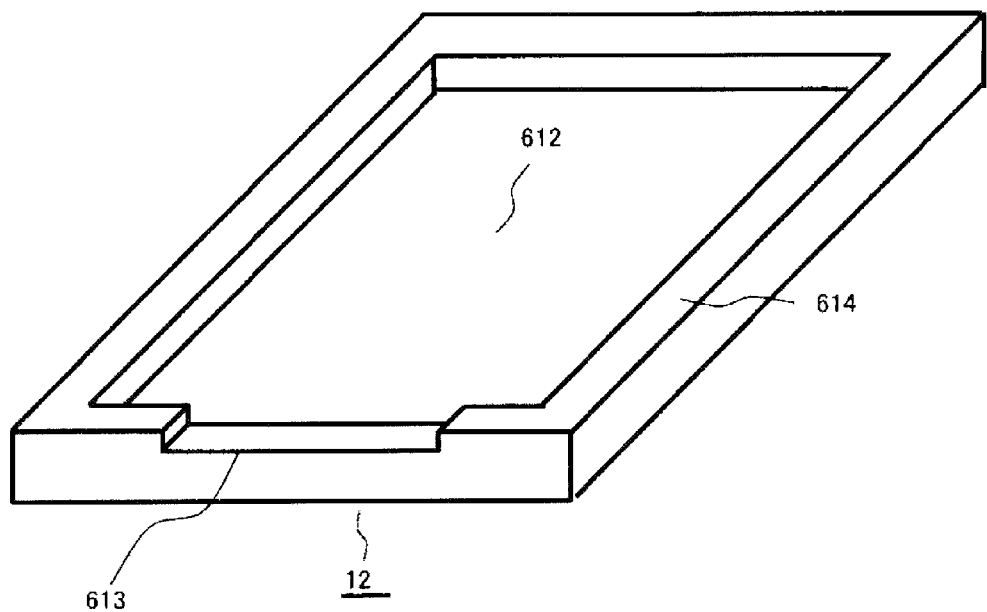
FIG. 9 is a perspective diagram schematically showing the structure of the front panel according to the embodiment of the present invention.

Next, the front panel 12 is described in reference to FIG. 9. FIG. 9 is a schematic perspective diagram showing the front panel 12 as viewed from the touch panel 400 side. A recess 612 is created in the front panel 12 so that the touch panel 400 can be contained. In addition, the peripheral portion 614 is thicker than the recess portion 612 so that the peripheral portion 614 secures a sufficient strength. In addition, a trench 613 is created in part of the peripheral portion 614 so that the flexible printed circuit board 71 can run to the outside from the recess 612.

The recess 612 can be provided in this front panel 12 by shaving the front panel 12. In addition, the thicker the peripheral portion 614 of the front panel 12 that is fixed to a housing or the like is, the stronger the strength of the device is when dropped. In the case of acryl, it is desirable for the thickness to be 0.7 mm to 1.0 mm, and in the case of glass, it is desirable for it to be 0.5 mm to 1.0 mm.

However, it is desirable for the operational surface of the touch panel 400 to be covered with a thin material because the sensitivity is low at the time of the operation with a finger if it is thick, and therefore, it is desirable for the thickness of the recess portion 612 to be 0.5 mm or less in the case of acryl and to be 0.8 mm or less in the case of glass.

Though the invention made by the present inventor is described in detail on the basis of the above embodiment, the present invention is not limited to the above-described embodiment and various modifications are possible as long as the gist of the invention is not deviated from.

What is claimed is:

1. A touch panel, comprising:
a touch panel substrate including a front surface and a rear surface opposed to the front surface;
a plurality of front electrodes formed on the front surface;
a rear electrode formed on the rear surface;
a plurality of first terminals formed along a first side of the front surface and connecting the plurality of front electrodes respectively for applying a touch detecting signal, and
a flexible printed circuit board provided along the first side of the front surface, wherein
the flexible printed circuit board has a terminal portion where a plurality of second terminals are formed,
the terminal portion has a front electrode connection portion and a rear electrode connection portion integrally,
the plurality of second terminals in the front surface electrode connection portion are electrically and mechanically connected to the plurality of first terminals respectively, and
the rear electrode connection portion is connected to the front surface, and folded from the front surface to the rear surface so that the rear electrode connection portion is mechanically and electrically connected to the rear electrode.

2. The touch panel according to claim 1, wherein the plurality of first terminals and the plurality of second terminals are connected by an anisotropic conductive film respectively, the rear electrode connection portion and the rear electrode are connected by the anisotropic conductive film, and the rear electrode connection portion and the front surface are connected by the anisotropic conductive film which connects the plurality of first terminals and the plurality of second terminals.

3. The touch panel according to claim 1, wherein the front electrode connection portion has a dummy electrode,
the dummy electrode is connected the front surface of the touch panel substrate.

4. The touch panel according to claim 1, wherein the rear electrode connection portion is folded on the rear surface along the first side of the touch panel substrate.

5. The touch panel according to claim 1, wherein the flexible printed circuit board has a shielding voltage wiring that is formed in the rear electrode connection portion and supplies a predetermined voltage to the rear electrode.

6. The touch panel according to claim 1, wherein a semiconductor chip for supplying the touch detecting signal is mounted on the flexible printed circuit board.

7. The touch panel according to claim 1, wherein the plurality of front electrodes include a plurality of X electrodes and a plurality of Y electrodes that cross the plurality of X electrodes.

8. A touch panel, comprising:
a touch panel substrate including a front surface and a rear surface opposed to the front surface;
a plurality of front electrodes formed on the front surface;
a rear electrode formed on the rear surface;
a plurality of first terminals formed along a first side of the front surface and connecting the plurality of front electrodes respectively for applying a touch detecting signal, and
a flexible printed circuit board provided along the first side of the front surface, wherein
the flexible printed circuit board has a plurality of second terminal and a rear electrode connection wiring integrally,
the plurality of second terminals are electrically and mechanically connected to the plurality of first terminals respectively, and
the rear electrode connection wiring portion is connected to the front surface mechanically, and folded from the front surface to the rear surface so that the rear electrode connection wiring is mechanically and electrically connected to the rear electrode.

9. The touch panel according to claim 8, wherein the plurality of first terminals and the plurality of second terminals are connected by an anisotropic conductive film respectively, and the rear electrode connection wiring portion and the rear electrode are connected by the anisotropic conductive film and the rear electrode connection wiring and the front surface are connected by the anisotropic conductive film which connects the plurality of first terminals and the plurality of second terminals.

10. The touch panel according to claim 8, wherein the flexible printed circuit board has a dummy electrode,
the dummy electrode is connected to the front surface of the touch panel substrate.

11. The touch panel according to claim 8, wherein the rear electrode connection wiring is folded on the rear surface along the first side of the touch panel substrate.

12. The touch panel according to claim 8, wherein the rear electrode connecting wiring supplies a predetermined voltage to the rear electrode.

13. The touch panel according to claim 8, wherein a semiconductor chip for supplying the touch detecting signal is mounted on said flexible printed circuit board.

14. The touch panel according to claim 8, wherein the plurality of front electrodes include a plurality of X electrodes and a plurality of Y electrodes that cross the plurality of X electrodes.

* * * * *